United States Patent
Stiefel et al.

(10) Patent No.: US 11,322,758 B2
(45) Date of Patent: May 3, 2022

(54) REDUCTION OF CELL DEGRADATION IN FUEL CELL SYSTEMS

(71) Applicants: AUDI AG, Ingolstadt (DE); VOLKSWAGEN AG, Wolfsburg (DE)

(72) Inventors: Miriam Stiefel, Meinersen (DE); Lasse Schmidt, Wolfsburg (DE); Gerold Hübner, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 16/967,392

(22) PCT Filed: Jan. 23, 2019

(86) PCT No.: PCT/EP2019/051569
§ 371 (c)(1),
(2) Date: Aug. 4, 2020

(87) PCT Pub. No.: WO2019/149584
PCT Pub. Date: Aug. 8, 2019

(65) Prior Publication Data
US 2021/0091392 A1    Mar. 25, 2021

(30) Foreign Application Priority Data
Feb. 5, 2018 (DE) .................. 10 2018 201 696.8

(51) Int. Cl.
*H01M 8/04* (2016.01)
*H01M 8/04089* (2016.01)
*H01M 8/04302* (2016.01)
*H01M 8/04746* (2016.01)
*H01M 8/04858* (2016.01)

(52) U.S. Cl.
CPC ..... *H01M 8/04104* (2013.01); *H01M 8/0488* (2013.01); *H01M 8/04302* (2016.02); *H01M 8/04753* (2013.01); *H01M 2250/20* (2013.01)

(58) Field of Classification Search
CPC ......... H01M 8/04104; H01M 8/04302; H01M 8/04753; H01M 8/0488
See application file for complete search history.

(56) References Cited

U.S. PATENT DOCUMENTS

| | | |
|---|---|---|
| 4,910,099 A | 3/1990 | Gottesfeld |
| 2001/0028966 A1 | 10/2001 | Knights et al. |
| 2006/0159969 A1 | 7/2006 | Matsubayashi |
| 2008/0044703 A1* | 2/2008 | Shimoi ............ H01M 8/04223 429/413 |
| 2013/0164640 A1 | 6/2013 | Kasahara et al. |

FOREIGN PATENT DOCUMENTS

| | | |
|---|---|---|
| DE | 197 56 880 A1 | 7/1999 |
| DE | 102 21 146 A1 | 12/2003 |
| DE | 10 2005 032 217 A1 | 1/2007 |
| DE | 10 2006 034 547 A1 | 2/2007 |
| DE | 10 2006 035 851 A1 | 2/2007 |
| DE | 10 2014 209 789 A1 | 4/2015 |
| DE | 10 2014 221 476 A1 | 7/2015 |
| JP | 2005-209547 A | 8/2005 |
| JP | 2008-4485 A | 1/2008 |

* cited by examiner

*Primary Examiner* — Olatunji A Godo
(74) *Attorney, Agent, or Firm* — Seed IP Law Group LLP

(57) ABSTRACT

A method for reducing cell degradation in a fuel cell system includes adding oxygen-containing gas to a fuel in the anode chamber to prevent an increase in a cell voltage above a predetermined maximum value.

10 Claims, No Drawings

REDUCTION OF CELL DEGRADATION IN FUEL CELL SYSTEMS

BACKGROUND

Technical Field

Embodiments of the present invention relate to methods and devices for reducing cell degradation in fuel cell systems.

Description of the Related Art

A significant cause of degradation of fuel cells with polymer electrolyte membranes (PEM) is the dissolution or agglomeration of platinum, which is applied as a catalyst to the electrolyte membrane. This leads to a decrease in the electrochemical surface area (ECSA) of the membrane and a significant loss of performance of the fuel cell system.

BRIEF SUMMARY

An aim of embodiments of the present invention is to provide methods and devices which reduce cell degradation in fuel cell systems.

According to embodiments of the invention, cell degradation is reduced by suppressing the decrease in the active surface of the PEM or the dissolution or agglomeration of platinum by means of a limitation of the cell voltage.

It is known that the upper voltage limit (OPL) in the cycle mode is key to the degradation of a membrane electrode arrangement (MEA) due to dissolution of the platinum catalyst. An accelerated aging cycle in which the cell voltage varies between 0.6 V and 0.75 V can for example lead to a loss of ECSA of about 20%; an accelerated aging cycle between 0.6 V and 0.9 V can lead to a loss of over 50% of the ECSA. In addition, high cell potentials in a range of up to 1.4 V result in oxidation of the carbon support as a result of front formation when starting a fuel cell under air/air conditions.

A restriction of the OPL in the cycle to 0.75 V can thus reduce the extent of damage by dissolution and agglomeration of platinum by more than 50% compared with an OPL of 0.9 V. However, avoiding high stack potentials is difficult to achieve during real vehicle operation, since operating phases with idling mode of the fuel cell system repeatedly occur.

Methods for limiting the cell voltage or the OPL have already been made known, e.g., to charge the vehicle battery or to consume energy by the operation of additional electrical units, such as electric motors or electrical heaters in the idling mode of the fuel cell system. The cell voltage can also be reduced by discharging the fuel cell stack via a controllable resistor (voltage clipping). However, these methods have the disadvantage that they either waste energy or cannot be used when the vehicle battery is fully charged.

DETAILED DESCRIPTION

DE 10 2014 221 476 A1 discloses a hydrogen supply device for a fuel cell stack that briefly delivers hydrogen to a cathode to prevent a voltage drop of the cell due to a rapid load change during the dry state of the polymer electrolyte membrane of the cell. During a cold start, hydrogen is supplied to the anode and cathode simultaneously in order to prevent the formation of an excessively high voltage or a reverse voltage. The fuel cell stack comprises a component for connecting an air-carrying line to a hydrogen-carrying line.

Embodiments of the invention relate to a method for reducing cell degradation in fuel cell systems, in which an increase in the cell voltage of the fuel cells above a predetermined maximum value is prevented by adding an oxygen-containing gas to the fuel in the anode chamber.

The fuel may be hydrogen. However, other fuels, for example hydrocarbons such as natural gas or methane, or alcohols such as methanol or ethanol, can be used.

The oxygen-containing gas may be air, in particular compressed air. In another embodiment, pure oxygen is used as oxygen-containing gas.

The predetermined maximum value may be selected such that the degradation of the membrane electrode arrangement (MEA) in the fuel cell stack is minimized in the cycle mode of the fuel cell system, or the front formation occurring during starting of fuel cells and the harmful potentials occurring in the process are minimized. However, the predefined maximum value should not be lower than the cell voltage, which may be 0.6 V, for example, which is established during load mode.

The predefined maximum value of the cell voltage may be 0.75 V.

In the load mode of the fuel cell system, the cell voltage has a low value. This rises in idling mode and can assume values which lead to degradation of the MEA. Critical voltage spikes may also occur when the fuel cell system is restarted.

An increase in the cell voltage of the fuel cells above the predetermined maximum value may be prevented by adding an oxygen-containing gas, in particular air, to the fuel with which the anode chamber of the fuel cells is filled. As a result, the cell potential decreases and no harmful voltage level arises. Only enough oxygen-containing gas is added to the fuel in each case for the cell voltage to not exceed the predetermined maximum value.

The reduction of the cell voltage and the associated power loss can be again reduced immediately when there is a higher load requirement by interrupting the addition of the oxygen-containing gas to the fuel.

The method according to the embodiments of the invention described herein can be used both for reduction of the platinum dissolution occurring during voltage cycles, and of the oxidation of the carbon support occurring during starting of fuel cells and resulting from front formation.

Targeted addition of oxygen-containing gas to the fuel or a transfer of oxygen-containing gas to the fuel side of the fuel cell system ("gas crossover") can be realized in various ways.

In one embodiment of the method according to the invention, the oxygen-containing gas is added to the fuel at the stack inlet, i.e., in the inlet region of the fuel into the fuel cell stack. When the addition is adjusted, the original voltage spontaneously readjusts. This variant can advantageously be used to reduce the voltage spikes occurring when starting fuel cells.

In another embodiment of the method according to the invention, the oxygen-containing gas is added to the fuel via a connecting line between the cathode chamber and the anode chamber of the fuel cells. For example, a metering valve disposed between the cathode and anode of the stack enables targeted introduction of air into the anode region of the stack. After the air supply is interrupted, the original voltage spontaneously recovers.

Fuel cell systems having connection lines between cathode and anode chambers have already been made known. However, the connecting lines in such cases serve to remove water from the fuel cell by flushing the anode chamber with air.

DE 10 2006 034 547 A1 discloses a fuel cell system and control method for the fuel cell system. After cessation of power generation, the fuel cell system is flushed with air to expel water. The fuel cell system comprises valves that are adjusted to generate a defined airflow from an oxygen to a hydrogen side in combination with an air pressure generated by a compressor in order to flush out the anode side.

DE 10 2006 035 851 A1 describes a fuel cell system and a method for adjusting the charge volume of an energy store for the flushing process of the fuel cell system. When the operation of the fuel cell system is started or terminated, an oxygen-containing gas is supplied to the anode and cathode to remove the water generated by the membrane electrode assembly or the separators of the fuel cell during power generation. The fuel cell system comprises a valve between the hydrogen and oxygen supply lines, and directs gases from the oxygen supply line into the hydrogen supply line under positive pressure to expel water from the cathode and anode chambers, thereby increasing the stability of the power generation.

In a further embodiment of the method according to the invention, the oxygen-containing gas is added to the fuel by applying a pressure differential to the membrane between the anode chamber and cathode chamber. In this case, a pressure drop is generated within the range of critical potentials between the cathode chamber and anode chamber of the fuel cell so that oxygen from the cathode chamber passes through the membrane into the anode chamber and mixes with the fuel, as a result of which the cell potential decreases. In one embodiment, an overpressure is generated on the cathode side for this purpose.

In addition to reducing cell degradation and thus increasing the service life and robustness of the fuel cell system, further advantages can be achieved by the methods described herein. For example, the use of MEAs with a reduced noble metal content in the vehicle is made possible. Minimizing the hybridization component in the driving cycle reduces energy consumption and increases the range.

The subject-matter described herein also relates to a device for reducing cell degradation in a fuel cell system. The device comprises means for adding an oxygen-containing gas to the fuel and a control device configured to control the means.

The control device may be configured to prevent an increase in the cell voltage of the fuel cells beyond a predetermined maximum value by adding an oxygen-containing gas to the fuel in the anode chamber. In so doing, the control device regulates the metering of the oxygen-containing gas to the fuel and thus regulates the cell potential.

The devices described herein are particularly suitable for carrying out the methods described herein.

In one embodiment of the device, the means for adding an oxygen-containing gas to the fuel comprise a gas supply line including a metering valve to the inlet region of the fuel into the fuel cell stack. Via the metering valve, the control device regulates the inflow of the oxygen-containing gas to the stack inlet of the fuel flowing into the anode chambers of the fuel cells.

In another embodiment of the device, the means for adding an oxygen-containing gas to the fuel comprise a connecting line between the cathode chamber and the anode chamber of the fuel cells in which a metering valve is arranged. The control device regulates the flow of the oxygen-containing gas in the connecting line via the metering valve and thus the gas flow from the cathode chamber to the anode chamber of the fuel cells. In one variant, a crossover valve is installed in active regions of the unit cell (across all cells of the stack) with which a crossover can be produced in a targeted manner, for example by hydrogen conduction through stacks with outflow openings in the flow field.

In a further embodiment of the device, the means for adding an oxygen-containing gas to the fuel comprise means for generating a pressure differential between the anode chamber and the cathode chamber of the fuel cells. These can be, for example, pumps with which a pressure differential between the anode chamber and cathode chamber of the fuel cells can be generated. In one variant, the means comprise a compressor with which an overpressure can be generated on the cathode side of the fuel cells. The control device regulates the pumps or the compressor and thus the pressure differential between the anode chamber and cathode chamber of the fuel cells or the pressure differential across the PEM. The permeation rate of the oxygen-containing gas through the membrane is thereby set to the anode side.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for reducing cell degradation in a fuel cell system, comprising:
preventing a cell voltage of a fuel cell in the fuel cell system established during a load mode from increasing above 0.75 V during an idling mode, a cycling mode, or during starting or restarting of the fuel cell system by adding an oxygen-containing gas to a fuel in an anode chamber of the fuel cell, wherein only enough oxygen-containing gas is added to the fuel for the cell voltage to not rise above 0.75 V.

2. The method according to claim 1, wherein the oxygen-containing gas is added to the fuel at a stack entry.

3. The method according to claim 1, wherein the oxygen-containing gas is added to the fuel via a connecting line between a cathode chamber and the anode chamber.

4. The method according to claim 1, wherein the oxygen-containing gas is added to the fuel by applying a pressure differential to a membrane between the anode chamber and a cathode chamber.

5. The method according to claim 1, wherein the fuel is hydrogen.

6. The method according to claim 1, wherein the oxygen-containing gas is air.

7. A device for reducing cell degradation in a fuel cell system, comprising:
means for adding an oxygen-containing gas to a fuel; and
a control device configured to control the means for adding the oxygen-containing gas to the fuel,
wherein the control device is configured to prevent a cell voltage of a fuel cell in the fuel cell system established during a load mode from increasing above 0.75 V during an idling mode, a cycling mode, or during starting or restarting of the fuel cell system by adding an oxygen-containing gas to a fuel in an anode chamber of the fuel cell, wherein the control device is configured to regulate metering of the oxygen-containing gas to the fuel and thus regulates the cell voltage, and wherein the control device is configured to add only enough oxygen-containing gas to the fuel for the cell voltage to not rise above 0.75 V.

8. The device according to claim 7, wherein the means for adding an oxygen-containing gas to the fuel comprises a gas supply line including a metering valve to an inlet region of the fuel into the fuel cell system.

9. The device according to claim 7, wherein the means for adding an oxygen-containing gas to the fuel comprises a connecting line including a metering valve between a cathode chamber and the anode chamber of the fuel cell.

10. The device according to claim 7, wherein:

the means for adding an oxygen-containing gas to the fuel includes pumps and/or a compressor with which an overpressure can be generated on a cathode side of the fuel cell with respect to an anode side of the fuel cell; and the control device regulates the pumps and/or the compressor and thus sets a permeation rate of the oxygen-containing gas through a membrane from the cathode side of the fuel cell to the anode side of the fuel cell.

* * * * *